(12) United States Patent
Freed et al.

(10) Patent No.: US 11,562,029 B2
(45) Date of Patent: *Jan. 24, 2023

(54) DYNAMIC QUERY PROCESSING AND DOCUMENT RETRIEVAL

(71) Applicant: International Business Machines Corporation, Armonk, NY (US)

(72) Inventors: Andrew R. Freed, Cary, NC (US); Shikhar Kwatra, Durham, NC (US); Corville O. Allen, Morrisville, NC (US); Joseph Kozhaya, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 217 days.

This patent is subject to a terminal disclaimer.

(21) Appl. No.: 17/095,321

(22) Filed: Nov. 11, 2020

(65) Prior Publication Data
US 2021/0064668 A1 Mar. 4, 2021

Related U.S. Application Data

(63) Continuation of application No. 16/245,344, filed on Jan. 11, 2019, now Pat. No. 10,909,180.

(51) Int. Cl.
*G06F 16/00* (2019.01)
*G06F 16/9032* (2019.01)
(Continued)

(52) U.S. Cl.
CPC ...... *G06F 16/90332* (2019.01); *G06F 16/906* (2019.01); *G06F 16/90348* (2019.01);
(Continued)

(58) Field of Classification Search
CPC .. G06F 9/45512; G06F 11/1469; G06F 16/00; G06F 16/1794; G06F 16/182; G06F 16/1827; G06F 16/3344; G06F 16/335; G06F 16/353; G06F 16/355; G06F 16/58; G06F 16/9024; G06F 16/90332; G06F 16/90348; G06F 16/906; G06F 16/93;
(Continued)

(56) References Cited

U.S. PATENT DOCUMENTS 6,968,308 B1 * 11/2005 Brockett ............... G06F 40/284
704/9
7,349,899 B2 3/2008 Namba
(Continued)

OTHER PUBLICATIONS https://www.elastic.co/guide/en/elasticsearch/reference/current/query-dsl-mlt-query.html, Sep. 2018.
(Continued)

*Primary Examiner* — Gerald Gauthier
(74) *Attorney, Agent, or Firm* — Lieberman & Brandsdorfer, LLC

(57) ABSTRACT

Embodiments relate to an intelligent computer platform to identify a lexical answer type (LAT), a first concept relevant to the received request and a second concept related to the identified first concept. The LAT, together with the first and second concepts are utilized to create a first and second cluster. Documents are selectively populated into the clusters. The clusters are subject to sorting based on a relevancy protocol.

20 Claims, 11 Drawing Sheets

(51) Int. Cl.
*G06F 16/906* (2019.01)
*G06N 5/02* (2006.01)
*G06F 16/93* (2019.01)
*G06N 20/00* (2019.01)
*G06F 16/903* (2019.01)
*G06F 40/284* (2020.01)

(52) U.S. Cl.
CPC ............ *G06F 16/93* (2019.01); *G06F 40/284* (2020.01); *G06N 5/02* (2013.01); *G06N 20/00* (2019.01)

(58) Field of Classification Search
CPC .... G06F 16/951; G06F 21/565; G06F 40/166; G06F 40/20; G06F 40/284; G06F 9/54; G06F 9/547; G06F 16/285; G06F 16/35; G06F 16/90344; G06F 16/904; G06F 40/268; G06F 40/30; G06F 40/40; G06N 5/02; G06N 5/025; G06N 7/08; G06N 20/00; G06N 3/082; H04L 9/3236; H04L 41/0893; H04L 63/0853; H04L 63/104; H04L 63/123; H04L 65/1043; H04L 65/75; H04L 67/10; H04L 67/53; H04L 67/568; H04N 21/25875; H04N 21/4302
See application file for complete search history.

(56) References Cited

U.S. PATENT DOCUMENTS

| | | | |
|---|---|---|---|
| 8,145,623 B1 | 3/2012 | Mehta et al. | |
| 8,275,803 B2 | 9/2012 | Brown et al. | |
| 8,473,499 B2 | 6/2013 | Song et al. | |
| 8,666,983 B2 | 3/2014 | Brill et al. | |
| 9,064,001 B2 | 6/2015 | Liu et al. | |
| 9,449,018 B1* | 9/2016 | Ma | G06F 16/182 |
| 9,508,038 B2 | 11/2016 | Ferrucci et al. | |
| 9,679,018 B1* | 6/2017 | Yuksel | G06F 16/335 |
| 9,942,578 B1* | 4/2018 | Vantalon | H04N 21/4302 |
| 9,984,772 B2 | 5/2018 | Liu et al. | |
| 10,331,684 B2 | 6/2019 | Chaubal et al. | |
| 10,664,763 B2 | 5/2020 | Allen et al. | |
| 10,885,119 B2* | 1/2021 | Ramachandra Iyer | G06F 16/904 |
| 10,909,180 B2* | 2/2021 | Freed | G06N 20/00 |
| 10,963,495 B2* | 3/2021 | Dobrynin | G06F 16/3344 |
| 2002/0059173 A1* | 5/2002 | Honda | G06F 16/58 |
| 2002/0065845 A1 | 5/2002 | Naito et al. | |
| 2006/0117002 A1* | 6/2006 | Swen | G06F 16/353 |
| 2006/0259481 A1 | 11/2006 | Handley | |
| 2007/0094285 A1 | 4/2007 | Agichtein et al. | |
| 2007/0244915 A1* | 10/2007 | Cha | G06F 16/355 |
| 2009/0287678 A1 | 11/2009 | Brown et al. | |
| 2010/0030769 A1 | 2/2010 | Cao et al. | |
| 2011/0087686 A1 | 4/2011 | Brewer et al. | |
| 2011/0246427 A1* | 10/2011 | Modak | G06F 11/1469 707/705 |
| 2012/0158158 A1* | 6/2012 | Spring | G06F 40/40 706/45 |
| 2012/0290926 A1* | 11/2012 | Kapadia | G06F 40/166 715/255 |
| 2012/0330921 A1 | 12/2012 | Ferrucci et al. | |
| 2013/0117372 A1* | 5/2013 | Digate | H04L 65/1043 709/204 |
| 2013/0246532 A1* | 9/2013 | Hirano | H04N 21/25875 709/205 |
| 2013/0268260 A1 | 10/2013 | Lundberg et al. | |
| 2014/0006012 A1 | 1/2014 | Zhou et al. | |
| 2014/0019605 A1* | 1/2014 | Boberg | H04L 41/0893 709/223 |
| 2014/0040233 A1 | 2/2014 | Ozonat et al. | |
| 2014/0172756 A1 | 6/2014 | Clark et al. | |
| 2014/0280169 A1 | 9/2014 | Liu et al. | |
| 2014/0280395 A1* | 9/2014 | Medard | G06F 16/1827 707/823 |
| 2014/0359055 A1* | 12/2014 | Clark | H04L 67/10 709/217 |
| 2015/0032443 A1* | 1/2015 | Karov | G06F 40/30 704/9 |
| 2015/0057992 A1* | 2/2015 | Danielyan | G06F 40/268 704/9 |
| 2015/0227520 A1 | 8/2015 | Clark et al. | |
| 2015/0234937 A1* | 8/2015 | Onishi | G06F 16/90332 707/752 |
| 2015/0278189 A1* | 10/2015 | Booth | G06F 40/284 704/9 |
| 2015/0278198 A1 | 10/2015 | Andreev | |
| 2015/0293900 A1* | 10/2015 | Saadi | G06F 40/284 704/9 |
| 2016/0048516 A1 | 2/2016 | Guiliano et al. | |
| 2016/0127440 A1* | 5/2016 | Gordon | H04L 65/75 709/219 |
| 2016/0132501 A1 | 5/2016 | Mengle et al. | |
| 2016/0133146 A1 | 5/2016 | Bak | |
| 2016/0156631 A1* | 6/2016 | Viswanathan | H04L 63/123 726/3 |
| 2016/0162465 A1* | 6/2016 | Nagarajan | G06F 40/284 704/9 |
| 2016/0232221 A1 | 8/2016 | McCloskey et al. | |
| 2016/0247086 A1* | 8/2016 | Walker | G06N 7/08 |
| 2017/0006161 A9 | 1/2017 | Riahi et al. | |
| 2017/0026466 A1* | 1/2017 | Kimchi | H04L 63/104 |
| 2017/0039293 A1 | 2/2017 | Kummamuru et al. | |
| 2017/0104741 A1* | 4/2017 | Sadr | H04L 63/0853 |
| 2017/0116291 A1* | 4/2017 | Sunny | H04L 67/568 |
| 2017/0206353 A1* | 7/2017 | Jai | G06F 21/565 |
| 2017/0372190 A1 | 12/2017 | Bishop et al. | |
| 2018/0082184 A1 | 3/2018 | Guo et al. | |
| 2018/0089305 A1 | 3/2018 | Croutwater et al. | |
| 2018/0095772 A1* | 4/2018 | Wu | G06F 16/00 |
| 2018/0095807 A1* | 4/2018 | Wu | G06F 9/45512 |
| 2018/0357262 A1 | 12/2018 | He et al. | |
| 2018/0358122 A1 | 12/2018 | Raghotham et al. | |
| 2019/0012373 A1 | 1/2019 | Malik et al. | |
| 2019/0073424 A1* | 3/2019 | Mullins | G06F 16/951 |
| 2019/0179940 A1 | 6/2019 | Ross et al. | |
| 2019/0303364 A1 | 10/2019 | He et al. | |
| 2019/0317991 A1 | 10/2019 | Abrahams et al. | |
| 2019/0354544 A1 | 11/2019 | Hertz et al. | |
| 2019/0355270 A1* | 11/2019 | McCann | G06N 3/082 |
| 2020/0036723 A1* | 1/2020 | Ranchod | H04L 67/53 |
| 2020/0050638 A1* | 2/2020 | Hancock | G06F 16/90344 |
| 2020/0065857 A1 | 2/2020 | Lagi et al. | |
| 2020/0104648 A1 | 4/2020 | Yadav | |
| 2020/0110834 A1* | 4/2020 | Croutwater | G06F 16/285 |
| 2020/0112437 A1* | 4/2020 | Nakamura | H04L 9/3236 |
| 2020/0134025 A1* | 4/2020 | Margulis | G06F 16/35 |
| 2020/0150981 A1* | 5/2020 | Westberg | G06F 9/547 |
| 2020/0184339 A1 | 6/2020 | Li et al. | |
| 2020/0226180 A1* | 7/2020 | Freed | G06F 16/906 |
| 2020/0226213 A1* | 7/2020 | Freed | G06F 16/90332 |
| 2021/0064569 A1* | 3/2021 | Yamada | G06F 16/1794 |
| 2021/0064668 A1* | 3/2021 | Freed | G06F 40/20 |

OTHER PUBLICATIONS

List of IBM Patents or Applications Treated as Related, Nov. 2020.

* cited by examiner

DYNAMIC QUERY PROCESSING AND DOCUMENT RETRIEVAL

CROSS REFERENCE TO RELATED APPLICATION(S)

This application is a Continuation patent application claiming the benefit of the filing date of U.S. patent application Ser. No. 16/245,344 filed on Jan. 11, 2019 and titled "Dynamic Query Processing and Document Retrieval", now U.S. Pat. No. 10,909,180, the entire contents of which are hereby incorporated by reference.

BACKGROUND

The present embodiment(s) relate to natural language processing. More specifically, the embodiment(s) relate to an artificial intelligence platform to optimize document retrieval in natural language processing.

In the field of artificial intelligent computer systems, natural language systems (such as the IBM Watson® artificial intelligent computer system and other natural language question answering systems) process natural language based on knowledge acquired by the system. To process natural language, the system may be trained with data derived from a database or corpus of knowledge, but the resulting outcome can be incorrect or inaccurate for a variety of reasons relating to the peculiarities of language constructs and human reasoning or new training data that is incorrect.

Machine learning, which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use data minimum, visual recognition, and natural language processing to solve problems and optimize human processes.

Cognitive systems are inherently non-deterministic. Specifically, data output from cognitive systems are susceptible to information provided and used as input. For example, as new machine learning models are deployed there is no guarantee that the system will extract the same entities as done previously. New models may adversely affect prior model results. Similarly, an error introduced through a document may result in extracting incorrect data and providing the incorrect data as output. Accordingly, there is a need to create deterministic behavior in the cognitive system(s).

SUMMARY

The embodiments include a system, computer program product, and method for natural language processing directed at deterministic data for cognitive systems.

In one aspect, a system is provided with an artificial intelligence (AI) platform in communication with a processing unit. The AI platform includes tools in the form of managers, including at least a request manager and a cluster manager. The request manager functions to identify a lexical answer type (LAT) and one or more concepts, including first and second concepts. The cluster manager utilizes the LAT and the concepts and forms clusters, including first and second clusters. The first cluster has one or more documents having the LAT and the first concept and the second cluster has one or more documents having a combination of the first and second concepts. The cluster manager subjects the first and second clusters to a sort according to the received request. Query results are formed as a function of the cluster sort, with the query results including at least one representative passage for each cluster.

In another aspect a computer program product is provided to support document retrieval. The computer program product includes a computer readable storage device having embodied program code that is executable by a processing unit. Program code is provided to identify a lexical answer type (LAT) and one or more concepts, including first and second concepts. Program code utilizes the LAT and the concepts and forms clusters, including first and second clusters. The first cluster has one or more documents having the LAT and the first concept and the second cluster has one or more documents having a combination of the first and second concepts. Program code subjects the first and second clusters to a sort according to the received request. Query results are formed as a function of the cluster sort, with the query results including at least one representative passage for each cluster.

In yet another aspect, a method is provided for receiving a request for processing. A lexical answer type (LAT) and one or more concepts, including first and second concepts, are identified. The LAT and the concepts are utilized to form clusters, including first and second clusters. The first cluster has one or more documents having the LAT and the first concept and the second cluster has one or more documents having a combination of the first and second concepts. The first and second clusters are subject to sorting. Query results are formed as a function of the cluster sort, with the query results including at least one representative passage for each cluster.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
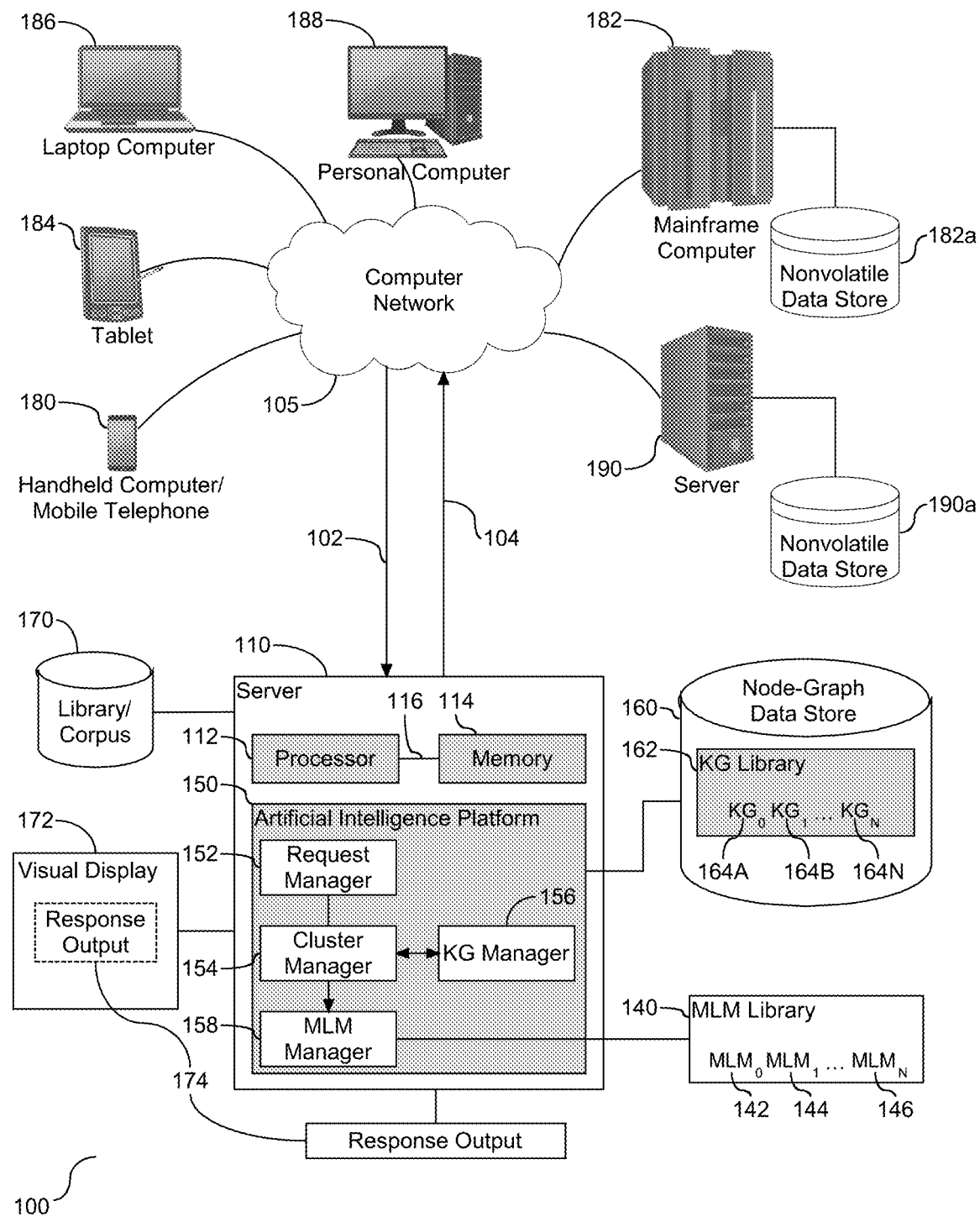
FIG. 1 depicts a system diagram illustrating a schematic diagram of a natural language process system.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Ontology functions as a structural framework to organize information and concepts. Natural language understanding (NLU) is a subset of natural language processing (NLP). The question-answering process in natural language systems, such as the IBM Watson® artificial intelligent computer system, begins with a question analysis phase that attempts to determine what the question is asking for and how best to approach answering the question. It is understood that question analysis receives as input an unstructured text question and identifies syntactic and semantic elements of the question, which are encoded as structured information. Question analysis is built on a foundation of general-purpose parsing and semantic analysis components.

Detection rules and classifiers are employed to identify one or more critical elements of the question. Such critical elements include, but are not limited to, lexical answer types (LATs). As referred to herein, the LAT is a word in or a word inferred from the clue question) that indicates the type of the answer, independent of assigning semantics to that word. For example, in the clue " . . . Invented in the 1500s to speed up the game, this maneuver involves two pieces of the same size . . . " the LAT is the string "maneuver", The LAT is extracted by a question analysis component as part of the "focus". The focus is the part of the question that, if replaced by the answer, makes the question a standalone statement. The focus often, but not always, contains the LAT.

NLU uses algorithms to transform speech into a structured ontology. In one embodiment, the ontology is constructed from the taxonomy of NLU output. NLU provides the definitions required to construct the ontology in terms of classes, subclasses, domain, range, data properties, and object properties. Ontology individuals are mapped to objects. The ontology is generated with facts or mentions which make up the individuals of the ontology. In one embodiment, the ontology is in the form of a KG with the facts or mentions represented as nodes in the graph. The structure of the KG may be kept constant, while allowing information to be added or removed. When the KG is modified, new entities and relationships are realized. Accordingly, the ontology as represented by the KG functions as a structure of terms constructed from the taxonomy of NLU output.

Referring to FIG. 1, a schematic diagram of a natural language processing system (100) is depicted. As shown, a server (110) is provided in communication with a plurality of computing devices (180), (182), (184), (186), and (188) across a network connection (105). The server (110) is configured with a processing unit (112) operatively coupled to memory (114) across a bus (116). A tool in the form of an artificial intelligence (AI) platform (150) is shown local to the server (110), and operatively coupled to the processing unit (112) and/or memory (114). As shown, the AI platform (150) contains one or more tools, shown herein as a request manager (152), a cluster manager (154), a knowledge graph (KG) manager (156), and a machine learning manager (MLM) (158). The tools (152)-(158) provide natural language processing over the network (105) from one or more computing devices (180), (182), (184), (186) and (188). More specifically, the computing devices (180), (182), (184), (186), and (188) communicate with each other and with other devices or components via one or more wires and/or wireless data communication links, where each communication link may comprise one or more of wires, routers, switches, transmitters, receivers, or the like. In this networked arrangement, the server (110) and the network connection (105) may enable natural language processing and resolution for one or more content users. Other embodiments of the server (110) may be used with components, systems, sub-systems, and/or devices other than those that are depicted herein.

The tools, including the AI platform (150), and in one embodiment, the tools in the form of managers (152)-(158) embedded therein, is configured to receive input from various sources, including but not limited to input from the network (105) and one or more knowledge graphs from an operatively coupled data store (160). As shown, the data store (160) includes a KG library (162) of knowledge graphs, including $KG_0$ (164A), $KG_1$ (164B), and $KG_N$ (164N). The quantity of KGs shown herein should not be considered limiting. Each KG is a representation of an ontology of concepts. More specifically, each KG (164A), (164B), and (164N) includes a plurality of related subjects and objects. In one embodiment, related KGs are stored in an associated KG container, with the corpus (160) storing one or more KG containers. In one embodiment, KGs may also be acquired from other sources, and as such, the data store depicted should not be considered limiting.

The various computing devices (180), (182), (184), (186), and (188) in communication with the network (105) demonstrate access points for content creators and content uses. Some of the computing devices may include devices for a database storing the corpus of data as a body of information used by the AI platform (150), and in one embodiment the tools (152)-(158), to embed deterministic behavior into the system. The network (105) may include local network connections and remote connections in various embodiments, such that the AI platform (150) and the embedded tools (152)-(158) may operate in environments of any size, including local and global, e.g. the Internet. Additionally, the server (110) and the AI platform (150) serves as a front-end system that can make available a variety of knowledge extracted from or represented in documents, network accessible sources and/or structured data sources. In this manner, some processes populate the server (110) with the server (110) also including an input interface to receive requests and respond accordingly. Content creators and content users may also be available in data repositories, such as, but not limited to the data store (160) and the list of demonstrated access points here should not be considered limiting.

As shown, the data store (160) is operatively coupled to the server (110). The node-graph data store (160) includes a KG library (162) with one or more KGs (164A)-(164N) for use by the server (110). Content users may access the system via API administration or orchestration platforms, as shown and described in FIG. 2, and natural language input received via the NLU input path.

As described in detail below, the server (110) and the AI platform (150) processes natural language queries through use of one or more machine learning models, hereinafter MLMs, to extract or store content in one or more KGs stored in the node-graph data store (160). The MLM manager (158) functions as a tool, or in one embodiment, an API within the AI platform (150), and is used to create, link, and/or modify an associated MLM. MLMs are generated, created, or modified specific to a particular knowledge domain. The MLMs are created to extract entities and relationships from unstructured data. These models are specifically created to understand a particular domain of knowledge (e.g. biographical information, stock market, astronomy, etc.). Wherever embodied, one or more MLMs are utilized to manage and process data, and more specifically, to detect and identify natural language and create or utilize deterministic output. The MLM manager (158) is shown operatively coupled to an MLM library (140) shown herein with a plurality of MLMs, including $MLM_0$, (142), $MLM_1$ (144), and $MLM_N$ (146), although the quantity of MLMs shown and described should not be considered limiting. It is understood that in one embodiment the MLM is an algorithm employed or adapted to support the NLP.

The server (110) may be the IBM Watson® system available from International Business Machines Corporation of Armonk, N.Y., which is augmented with the mechanisms of the illustrative embodiments described hereafter. The IBM Watson® knowledge manager system imports knowledge into natural language processing (NLP). Specifically, as described in detail below, as a query is received, relevant documents with respect to the query are identified. It is understood that relevancy is a subjective standard. The server (110) alone cannot differentiate, or more specifically, evaluate document relevancy with respect to the query. As shown herein, the server (110) receives input content (102) which is subject to evaluation to extract features of the content (102), which in one embodiment leverages the data store, and is then subject to organization for relevancy identification. Accordingly, received content (102) is processed by the IBM Watson® server (110) which performs analysis to evaluate the received query using one or more reasoning algorithms.

To process natural language, the server (110) utilizes an information handling system in the form of the AI platform (150) and associated tool (152)-(158) to support NLP. Though shown as being embodied in or integrated with the server (110), the AI platform (150) may be implemented in a separate computing system (e.g., 190) that is connected across the network (105) to the server (110). Although shown local to the server (110), tools (152)-(158) may collectively or individually be embedded in memory (114).

The one or more MLMs (142)-(146) function to manage data, including store data in a KG. As understood, each KG is a structured ontology and does not merely store data. The AI platform (150), and more specifically, the ML manager (158) utilizes a select MLM to extract data and one or more data relationships from unstructured data, create an entry for the extracted data and data relationship(s) in a KG, and store the data and data relationship(s) in the KG entry. In one embodiment, data in the KG is stored or represented in a node and a relationship between two data elements is represented as an edge connecting two nodes. Accordingly, the ML manager (158) utilizes a MLM to organize data and data relationships in a KG in the node-graph data store (160).

As shown and described herein, an MLM library (140) is operatively coupled to the server (110) and contains a plurality of MLMs to support natural language processing in the AI platform. One or more of the MLMs may be dynamic and trained to adapt to new entities and relationships. For example, a first MLM, $MLM_0$ (142), may be identified or selected from the library (140) based on its alignment with $KG_0$ (164A). In response to processing NL input, $MLM_0$ (142) may be applied against $KG_0$ (164A) and separately applied against a second KG, $KG_1$ (164B). The MLM manager (158) processes results from both KGs, and based on the processing, a modification of at least one of the KGs is identified. In one embodiment, the modification of $MLM_0$ (142) results in creation of a new MLM, e.g. $MLM_N$ (146), and in one embodiment retention of the original MLM, $MLM_0$ (142). Accordingly, the MLM library (140) and corresponding KG library (162) may expand subject to the dynamic modification of the MLMs and KGs, respectively.

It is understood that each KG organizes and provides structure to large quantities of data. A KG may be a single ontology, or in one embodiment, a KG or a KG container may be comprised of a plurality of KGs that are linked together to demonstrate their relationship or association. A large KG may be too cumbersome or expensive to manage. The KG manager (156) functions to organize and manage the KGs and the associated KG container. In this scenario, the KG may be partitioned, with the KG manager (156) effectively creating at least two partitions, e.g. a first KG partition and a second KG partition. The KG may be partitioned based on one or more factors. For example, in one embodiment, the KG may be partitioned by topics or sub-topics. Similarly, two or more KGs may be joined or linked by the KG manager (156), which is the inverse of partitioning a KG. The functionality of joining or linking KGs by the KG manager (156) utilizes comparison of one or more data elements in one KG with one or more data elements in a second KG and to eliminate or at least reduce the appearance of duplicate data. Different KGs may be associated with different knowledge domains, and may be a factor for joining or linking KGs. In one embodiment, data in the linked KGs determined to be duplicate data are selectively removed by the KG manager (156). One characteristic of removing duplicate data is the ability to maintain a constant structure of the KG.

The evaluation of the NL input is managed by the request manager (152). Specifically, the request manager (152) analyzes request content and identifies a lexical answer type (LAT) and at least one concept, a first concept $C_0$, present in the request. The KG manager (156) functions to identify a relevant KG from the KG library (162), and consults the identified KG to identify a second concept, $C_1$, that is related to the first concept, $C_0$. In one embodiment, the second concept, $C_1$, is associated with causing the first concept, $C_0$. The identified LAT and first and second concepts, $C_0$ and $C_1$, are utilized by the cluster manager (154) to identify relevant material from a corpus (170) or an operatively linked library of material. Specifically, the cluster manager (154) leverages the LAT and identified first and second concepts, $C_0$ and $C_1$, to identify contextually related documents or material in a library or corpus (170). The cluster manager forms two groupings of contextually related documents, referred to herein as clusters, including a first cluster, $cluster_0$, and a second cluster, $cluster_1$. The first and second clusters are related to the LAT and the identified first and second concepts, $C_0$ and $C_1$, respectively. More specifically, $cluster_0$ is formed by documents determined by the cluster manager (154) to be related to the LAT and the first concept, $C_0$, and $cluster_1$ is formed by documents determined by the cluster manager (154) to be related to a combined of the first and second concepts, $C_0$ and $C_1$, respectively. Accordingly, the first and second clusters are populated with material contextually related to a selection and combination of the LAT and the first and second concepts.

The cluster manager (154) processes the formed clusters, $cluster_0$ and $cluster_1$, to further identify one or more documents as a response to the query. It is understood that the query is processed against a library or corpus of documents, and the goal is to not only identify a relevant document, but a representative passage within a representative document that addresses or responds to the query. The cluster manager (154) sorts the clusters based on the relevancy of each cluster to the query being processed. Response output, e.g. query result (174), is identified by the cluster manager (154). In one embodiment, the query result (174) is conveyed on an operatively coupled visual display (172), or communicated to one or more computing devices across the network connection (105) via communication channel (104). The query result (174) identifies the representative document and associated representative passage from the sorted clusters. In one embodiment, the cluster manager (154) identifies a representative document for each cluster, and for each representative document, the cluster identifies a representative passage therein. The query result is based on the sort of the clusters, and in one embodiment may include a sequential presentation of documents and representative passages, with the sequence being placed in a hierarchical arrangement subject to the sort.

There are two aspects of information gain with respect to the cluster formations. These aspects include intra-cluster gain, and inter-cluster gain. The intra-cluster gain is directed at an intra-cluster metric and relevancy identification and sort in each of the formed clusters. The inter-cluster gain is directed at an inter-cluster metric and relevancy identification and sort across the formed clusters. The cluster manager (154) assesses both the intra-cluster metric and the inter-cluster metric. The intra-cluster metric is directed at the cluster manager (154) formation of the clusters, populating the clusters with relevant documents, and an intra-cluster sort of the populated documents. For each document, the cluster manager (154) identifies a representative passage. The intra-cluster sort provides a ranking of the documents and associated passage(s) on a cluster basis, with the sort basis being the query. The inter-cluster metric is directed at the cluster manager (154) directing a comparison of the formed clusters and a corresponding cluster ranking. Similar to the intra-cluster metric, the basis for the inter-cluster metric is also the query. Accordingly, the cluster manager (154) conducts a multi-dimensional metric analysis, and leverages corresponding metric gain data to identify appropriate query result data.

Types of information handling systems that can utilize system (110) range from small handheld devices, such as a handheld computer/mobile telephone (180) to large mainframe systems, such as a mainframe computer (182). Examples of a handheld computer (180) include personal digital assistants (PDAs), personal entertainment devices, such as MP4 players, portable televisions, and compact disc players. Other examples of information handling systems include pen or tablet computer (184), laptop or notebook computer (186), personal computer system (188) and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a). The nonvolatile data store (182a) can be a component that is external to the various information handling systems or can be internal to one of the information handling systems.

An information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
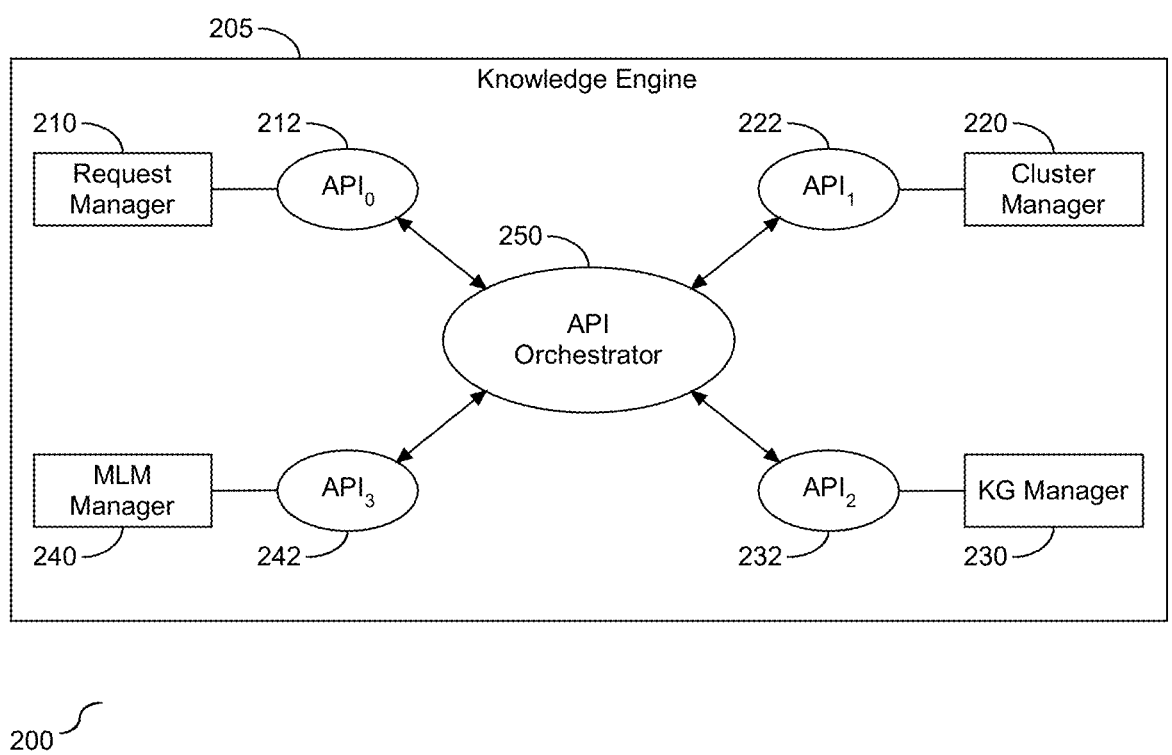
FIG. 2 depicts a block diagram a block diagram is provided illustrating the NL processing tools shown in FIG. 1 and their associated APIs.

An Application Program Interface (API) is understood in the art as a software intermediary between two or more applications. With respect NL processing system shown and described in FIG. 1, one or more APIs may be utilized to support one or more of the tools (152)-(158) and their associated functionality. Referring to FIG. 2, a block diagram (200) is provided illustrating the NL processing tools and their associated APIs. As shown, a plurality of tools are embedded within the AI platform, also referred to herein as knowledge engine (205), with the tools including the request manager (210) associated with $API_0$ (212), the cluster manager (220) associated with $API_1$ (222), the KG manager (230) associated with $API_2$ (232), and the MLM manager (240) associated with $API_3$ (242). Each of the APIs may be implemented in one or more languages and interface specifications. $API_0$ (212) provides for request detection and processing, including LAT and concept identification; $API_1$ (222) provides for cluster formation and processing, including inter-cluster and intra-cluster gain assessment; $API_2$ (232) provides for KG creation, update, and deletion; and $API_3$ (242) provides MLM creation, update and deletion. As shown, each of the APIs (212), (222), (232), and (242) are operatively coupled to an API orchestrator (250), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
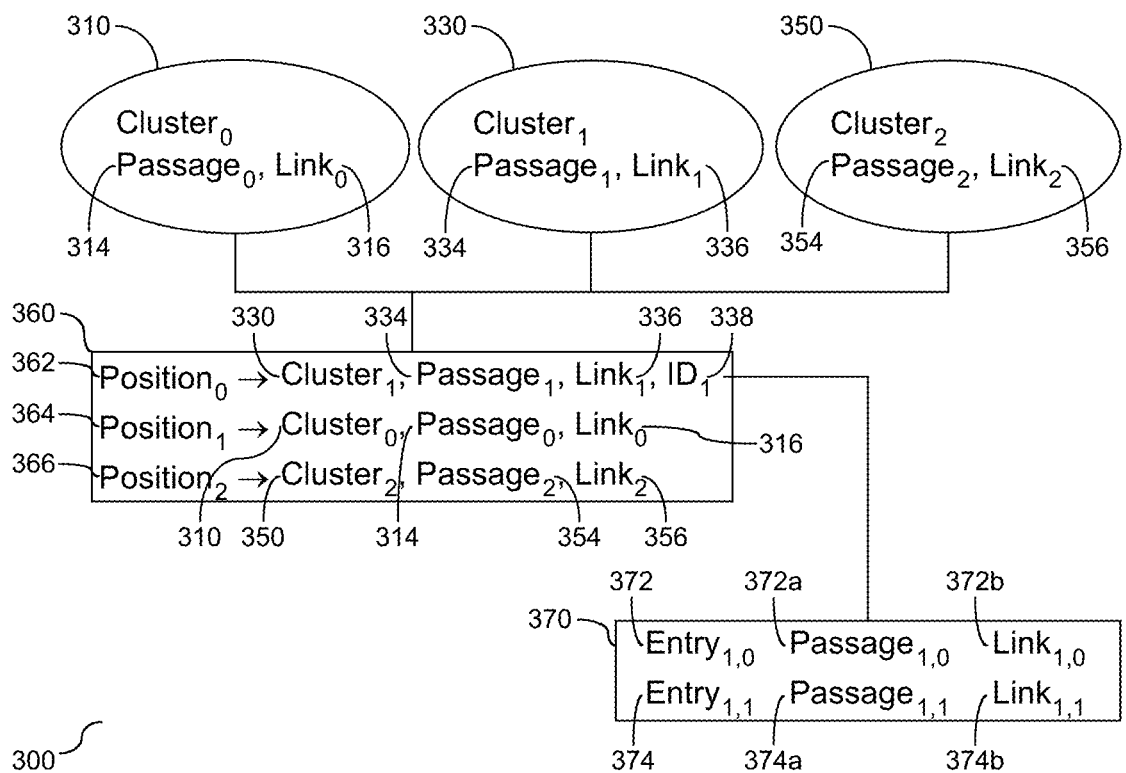
FIG. 3 depicts a block diagram illustrating formed clusters and associated sorting.

To provide additional details and an improved understanding of the select embodiments of the present disclosure, reference is now made to FIG. 3, which illustrates a block diagram of formed clusters and associated sorting. As shown in this example, three clusters of documents are formed, including $cluster_0$ (310), $cluster_1$ (330), and $cluster_2$ (350). Each cluster is shown with a representative passage and a link to a corresponding representative document. The intra-cluster metric assessment shown and described in FIG. 1 identifies the document link and passage for each of the represented clusters. Specifically, $cluster_0$ (310) includes $passage_0$ (314) and $link_0$ (316), $cluster_1$ (330) includes $passage_1$ (334) and $link_1$ (336), and $cluster_2$ (350) includes $passage_2$ (354) and $link_2$ (356). The inter-cluster metric assessment shown and described in FIG. 1 provides a sorting of the represented clusters. The sort is shown at (360) with the sort including a relevancy ranking of the clusters with the higher position being indicative of the relevancy. In this example, the sort of the clusters (360) shows the positions from more relevant to less relevant as (362), (364), and (366), with $cluster_1$ (330) shown at $position_0$ (362), $cluster_0$ (310) shown at $position_1$ (364), and $cluster_2$ (350) shown at $position_2$ (366). Each of the representative clusters in the sort (360) is shown with the respective passage and link. Accordingly, both an intra-cluster and inter-cluster assessment is shown and demonstrated.

The intra-cluster assessment provides a sorting of documents and associated passages within a cluster. It is understood that a representative passage and associated document or document link are provided for efficiency, and in one embodiment space restrictions. In the example shown herein, $cluster_1$ (330) in $position_0$ (362) includes $passage_1$ (334) and $link_1$ (336), and in addition an expansion identifier, $ID_1$ (338). The expansion identifier functions as an indicator that the subject cluster includes additional passages and/or links. Selection of the identifier, $ID_1$ (338), is shown at (370) with two additional entries, $entry_{1,0}$ (372) and $entry_{1,1}$ (374), each entry shown with a passage, including $passage_{1,0}$ (372a) and $passage_{1,1}$ (374a), respectively, and a corresponding link, including $link_{1,0}$ (372b) and $link_{1,1}$ (374b), respectively. The additional entries (372) and (374) are part of the intra-cluster ranking and sorting, and as such as shown herein in an order corresponding to the ranking and sorting. Accordingly, the expansion symbol is provided as an indicator of a plurality of sorted passages and/or documents within the cluster, with selection of the symbol conveying additional passages and corresponding links that are relevant or related to the representative passage and link.

Figure 4:
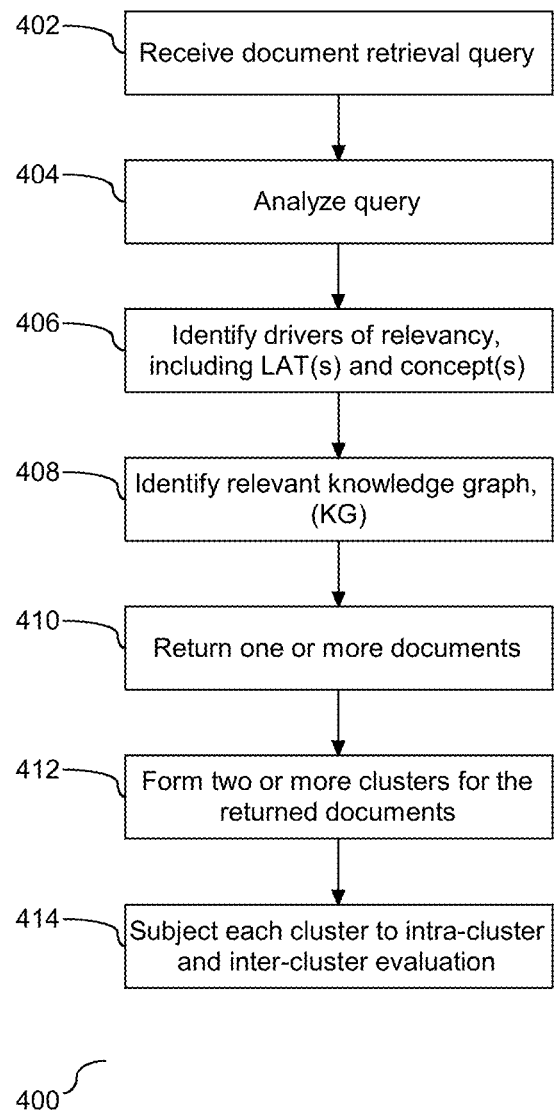
FIG. 4 depicts a flow chart illustrating a process for document retrieval and cluster formation.

To provide additional details for an improved understanding of selected embodiments of the present disclosure, reference is now made to FIG. 4 which illustrates a flow chart (400) demonstrating a process (400) for document retrieval and cluster formation. A document retrieval query is received (402) and analyzed (404). Drivers of relevancy in the query are identified (406). This identification includes ascertaining LATs and two or more concepts in the query. The KG in the data storage that is the subject of the LAT, and in one embodiment at least one of the identified concepts, is identified (408). In one embodiment, the KG identified at step (408) is leveraged to identify concepts, concept categories, and concept relationships. One or more documents related to the query are returned and subject to analysis according to the identified LAT(s) and concept categories (410). Two or more clusters of documents related to the query are formed (412). In one embodiment, each of the formed clusters is limited to a concept and/or the LAT. Each of the formed clusters is subject to inter-cluster and intra-cluster evaluation to ascertain both high and low cluster information gain (414). Accordingly, as shown herein, clusters of documents related to the query are created and subject to analysis with respect to information gain and corresponding query result identification.

Figure 5A:
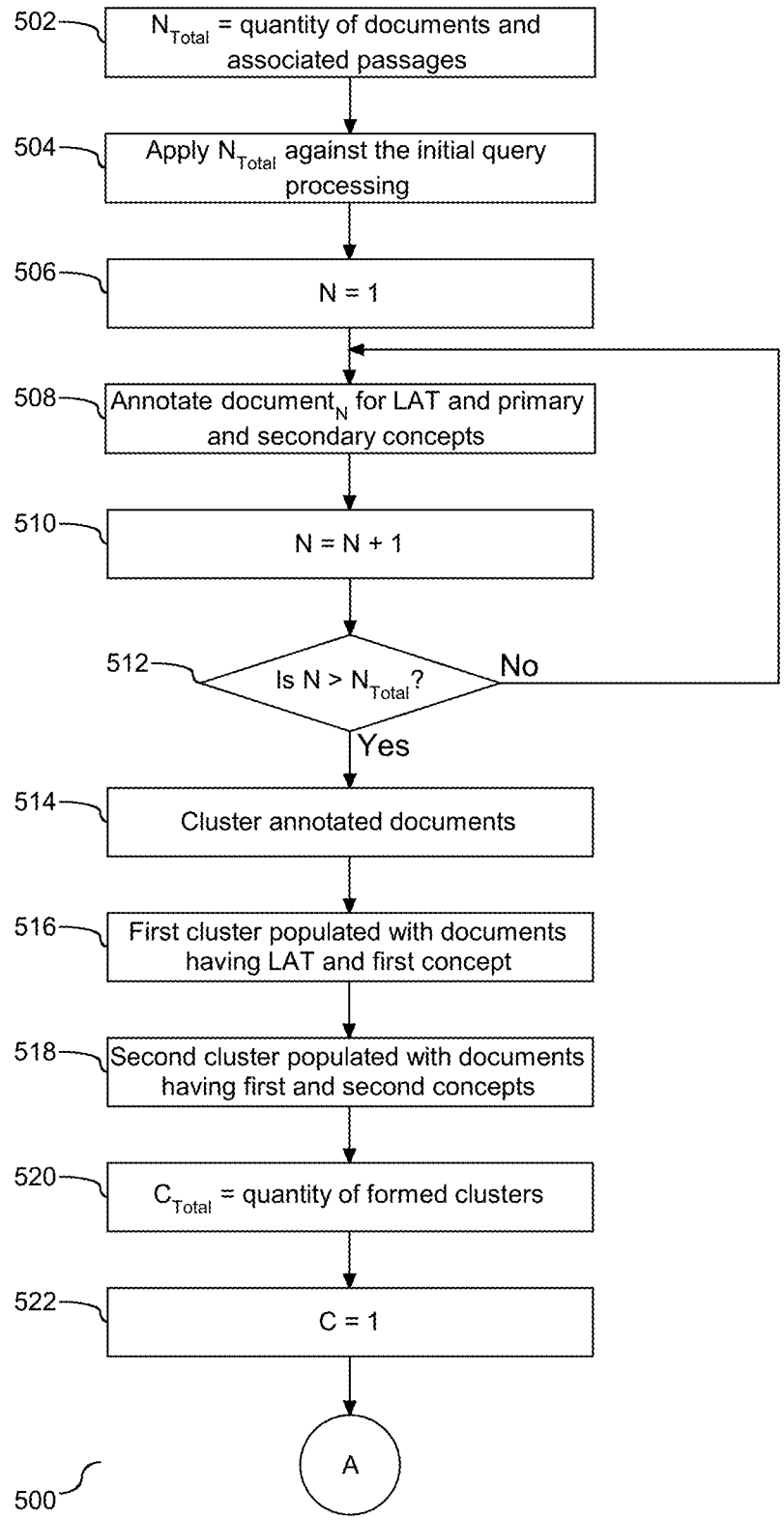
FIGS. 5A and 5B depict a flow chart illustrating a process for document and passage identification together with cluster metric analysis.
Figure 5B:
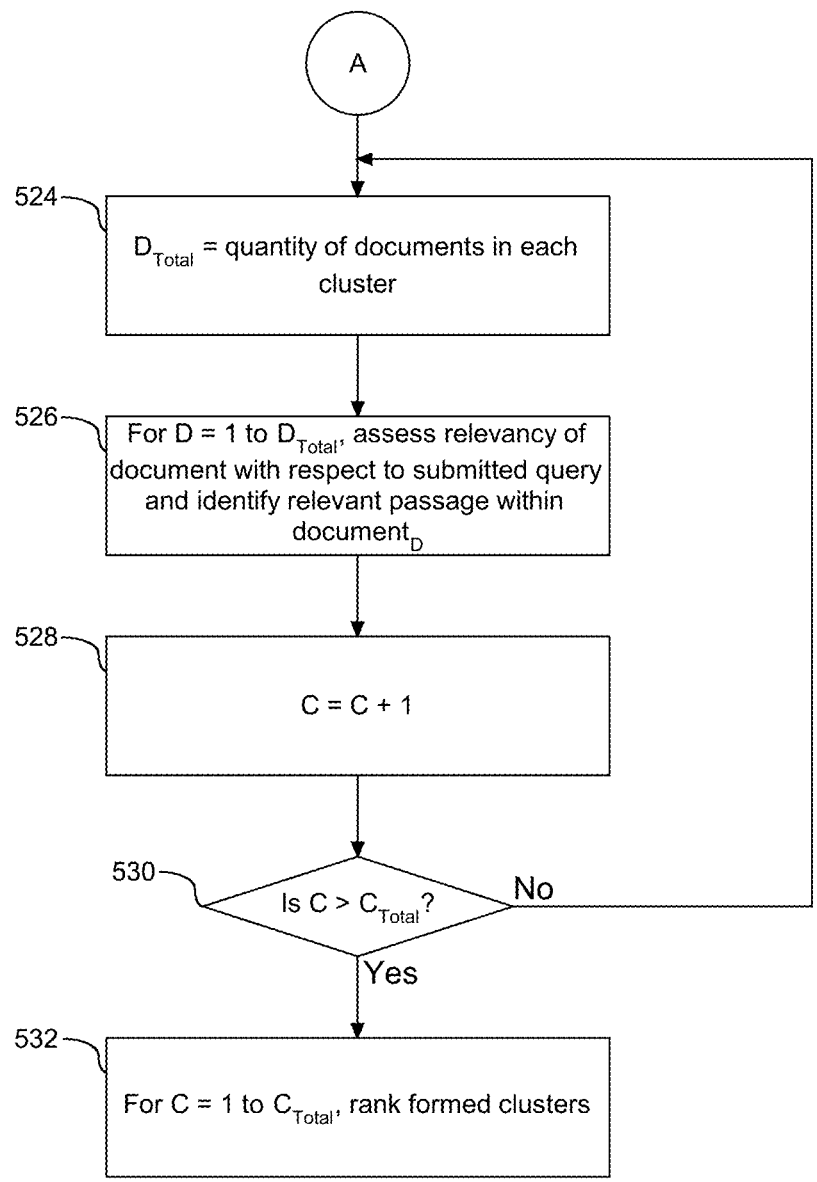

As briefly described in FIG. 4, the query is processed for LAT and concept identification. Referring to FIGS. 5A and 5B, a flow chart (500) is provided to illustrate a process (500) for document and passage identification together with cluster metric analysis. As shown and described in FIG. 4, a document retrieval query is received, and the elements of the query are analyzed to ascertain the LAT, and in one embodiment at least one concepts, and a KG related to the LAT and the primary concept is identified and leveraged to determine all non-query supplied concepts that are related to the LAT and/or the primary concept. The concepts identified through the KG are referred to herein as secondary concepts. It is understood that at least one secondary concept is identified through the KG. In one embodiment, there is a limit on the quantity of secondary concepts that may be returned through use of the KG. Accordingly, the first aspect of the query processing, as shown and described in FIG. 4, is directed at identification of the LAT in the query, and concept identification through a corresponding KG identification.

Once the LAT and concepts of the query have been identified, the query is submitted to a corpus or library of documents, to identify relevant material. In one embodiment, the query is a question, and documents and corresponding passages that provide answers to the query are returned. It is understood that a limit or threshold may be applied with respect to the quantity of documents returned from a preliminary search of the corresponding corpus or library. The limit, $N_{Total}$, is placed on the quantity of documents and associated passages that are returned from an initial aspect of the query process (502). In one embodiment, the limit is a configurable integer. The limit functions to manage processing burdens associated with query processing. The limit, $N_{Total}$ is applied against the initial query processing and any preliminary results in excess of the limit are not subject to further consideration or processing (504). Accordingly, the query processing shown herein is a multi-stage processing which places a limit or threshold on the quantity of documents subject to enhanced processing in order to manage processing burdens.

Following step (504), a corresponding document counting variable, N, is initialized (506) and the documents that are the subject of query processing are subject to annotation with respect to the received query. As shown, $document_N$ from initial query processing is annotated for the LAT and the primary and secondary concepts (508). Following the annotation, the document counting variable is incremented (510), and it is determined if all of the documents have been annotated (512). A negative response to the determination at step (512) is followed by a return to step (508), and a positive response concludes the annotation process. Accordingly, each of the documents identified in the initial query processing as containing data relevant to the LAT and the primary and second concepts is subject to annotation.

The annotated documents are subject to clustering in order to maximize information gain (514). At least two clusters are formed, with a first cluster including documents that contain both the identified LAT and the first concept (516) and a second cluster including documents that do not contain the LAT but contain the first and second concepts (518). In one embodiment, a third cluster, or additional clusters, may be formed from a different combination of the LAT and/or primary and secondary concepts, and in one embodiment additional concepts. Accordingly, the formation and characteristics of the two clusters shown herein should not be considered limiting.

As described in FIG. 1, an information gain assessment is conducted with respect to the cluster formation, including an inter-cluster gain and an intra-cluster gain. The intra-cluster gain is related to the ranking of documents within each of the formed clusters. More specifically, the documents within each cluster are assessed with respect to their relevancy to the cluster qualifying characteristics, e.g. LAT and selection of concepts, and the submitted query. Following the formation of the clusters, the variable $C_{Total}$ is assigned to represent the quantity of formed clusters (520), and a corresponding cluster counting variable, C, is initialized (522). As described in FIG. 1, it is understood that each cluster, C, may include one or more documents as containing results to the submitted query. The variable $D_{Total}$ represents that quantity of documents in each cluster identified as containing data related to the submitted query (524). For each document, D, in cluster, C, the relevancy of the document with respect to the submitted query is assessed and a relevant passage within each of the documents is identified (526). In one embodiment, the relevancy of the document with respect to the identified LAT and primary concept or the selection of identified concepts and the documents is also assessed at step (526). Following step (526), the cluster counting variable, C, is incremented (528) followed by an assessment to ascertain if the intra-cluster assessment, e.g. intra-cluster gain metric, has been conducted for each of the formed clusters (530). A negative response to the determination at step (53) is followed by a return to step (524), and a positive response to the determination at step (530) concludes the intra-cluster gain assessment. Accordingly, each document in the formed clusters is subject to assessment with respect to the query submission for intra-cluster gain assessment.

It is understood that the clusters may contain a different representation of documents and corresponding representative passages since the qualifying characteristics of the clusters are based on a different combination of factors, e.g. LAT and concept selection. Following step (530) the clusters are subject to a ranking based on their assessed relevancy with respect to the query submission. In one embodiment, the highest ranked document in each cluster and its corresponding rank value is utilized as a metric for cross-cluster ranking, e.g. inter-cluster gain assessment. As shown, the clusters from 1 to $C_{Total}$ are subject to ranking based on their internal sort and ranking, e.g. a representative cluster document, as well as relevancy with respect to the query submission (532). Results from the ranking include a presentation of the representative passage from the representative document for each cluster, a link to a corresponding representative document, and in one embodiment, an expansion identifier if there is more than one relevant document identified in the corresponding cluster. In one embodiment, a first cluster includes a first passage and a first representative document and a second cluster includes a second passage and a second representative document, etc. Accordingly, the results of the query assessment are presented with a representative passage from each cluster.

Figure 6:
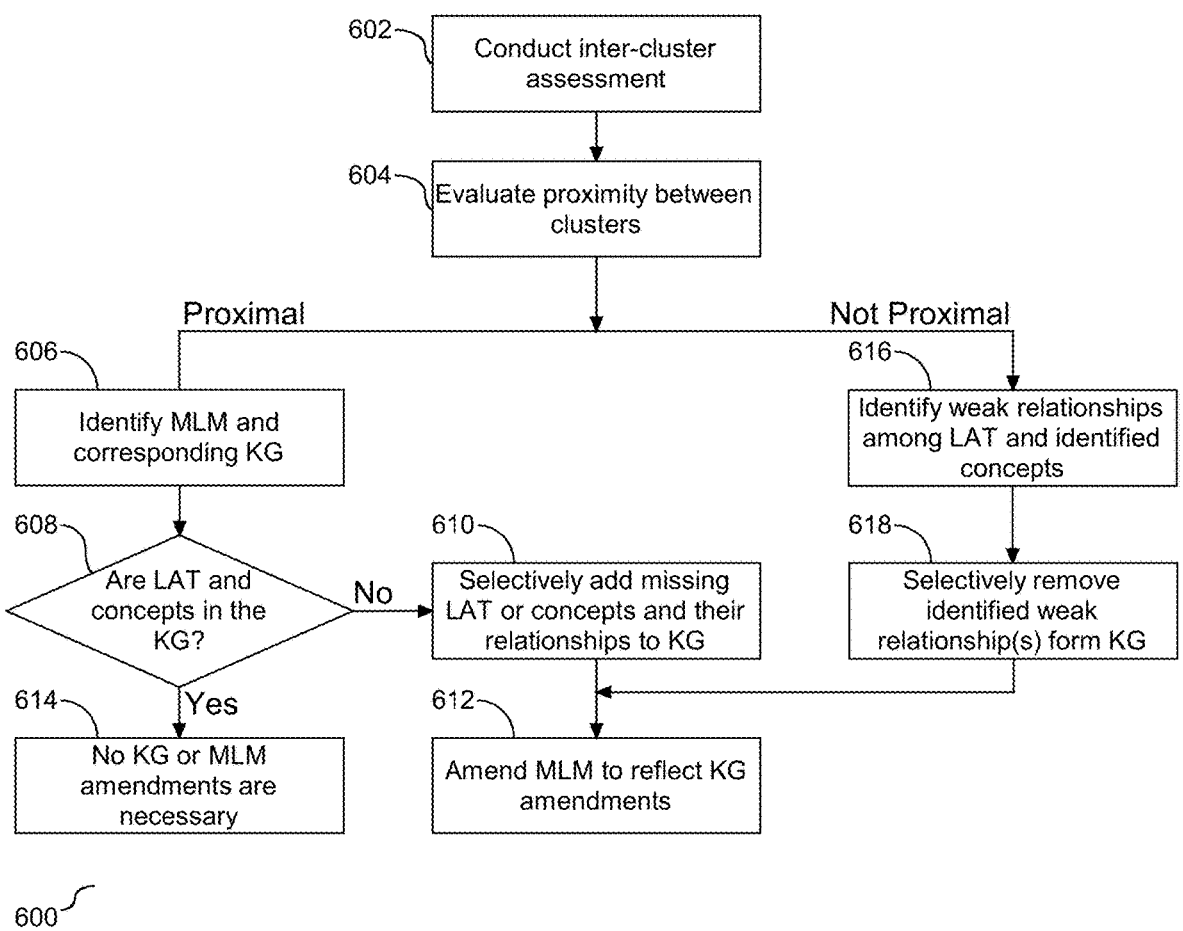
FIG. 6 depicts a flow chart illustrating inter-cluster assessment and the effects of the assessment on the subject KG and corresponding MLM.

After the clusters are formed two assessments are conducted, including an intra-cluster assessment to identify a passage and corresponding document representative of the cluster, and an inter-cluster assessment to identify an inter-cluster gain or loss. Referring to FIG. 6, a flow chart (600) is provided to illustrate the inter-cluster assessment and the effects of the assessment on the subject KG and corresponding MLM. As shown, the inter-cluster assessment is conducted (602). The assessment includes a numerical value reflecting an affinity across clusters, e.g. a strength of the relationship of the representative passage and corresponding document link between two clusters. An evaluation is conducted to assess the proximity between clusters with respect to their respective assessed values (604), e.g. numerical values. If it is determined that the assessed values are proximal, e.g. within a defined range, the MLM and corresponding KG are identified (606). In one embodiment, the proximity of the assessed value is an indication of an inter-cluster gain. It is then determined if the LAT and each of the identified concepts, $C_0$ and $C_1$, are present in the KG (608). A negative response to the determination at step (608) is followed by the KG manager selectively adding any of the missing LAT or concepts, together with their relationships to the KG (610), and the MLM manager amending the corresponding MLM to reflect the additions to the KG (612). Similarly, a positive response to the determination at step (608) indicates that the KG and corresponding MLM do not require any amending (614). However, if at step (604) it is determined that the assessed values are not proximal, this is an indication of an inter-cluster loss. The KG manager proceeds to identify the weak relationships among the LAT and the identified concepts (616), and selectively remove the identified weak relationship(s) present in the corresponding KG (618). In addition, the ML manager proceeds to step (612) to amend the corresponding MLM to reflect the amended KG (618). Accordingly, the KG and corresponding MLM are selectively and dynamically amended to reflect the inter-cluster gain assessment.

The system and flow charts shown herein may also be in the form of a computer program device for use with an intelligent computer platform in order to facilitate NL processing. The device has program code embodied therewith. The program code is executable by a processing unit to support the described functionality. As disclosed, the system, method, apparatus, and computer program product apply NL processing to support the MLM, and for the MLM to support the KG persistence.

Embodiments shown and described herein may be in the form of a computer system for use with an intelligent computer platform for providing dynamic query processing for development of a corresponding contextual response, and in one embodiment, contextual response data. A processing unit is operatively coupled to memory and is in communication with an artificial intelligence platform. A tool, in communication with the processing unit, is activated by the artificial intelligence platform and employed to provide LAT and concept identification and analysis as directed to the query. As described herein, the LAT is identified from an electronic communication, and in one embodiment, a corresponding communication interface. Two or more related concepts are identified, with at least one of the concepts corresponding to a relationship to the LAT as reflected in a corresponding KG. Clusters are formed from combinations of the LAT and/or concepts, and populated with one or more documents based on their relationship and proximity to the characteristics of the combination of LAT and/or concepts of the respective clusters. Both intra-cluster and inter-cluster assessments are conducted, with the intra-cluster assessments directed at representative response data, and inter-cluster assessments directed at dynamic KG and associated MLM maintenance.

Figure 7:
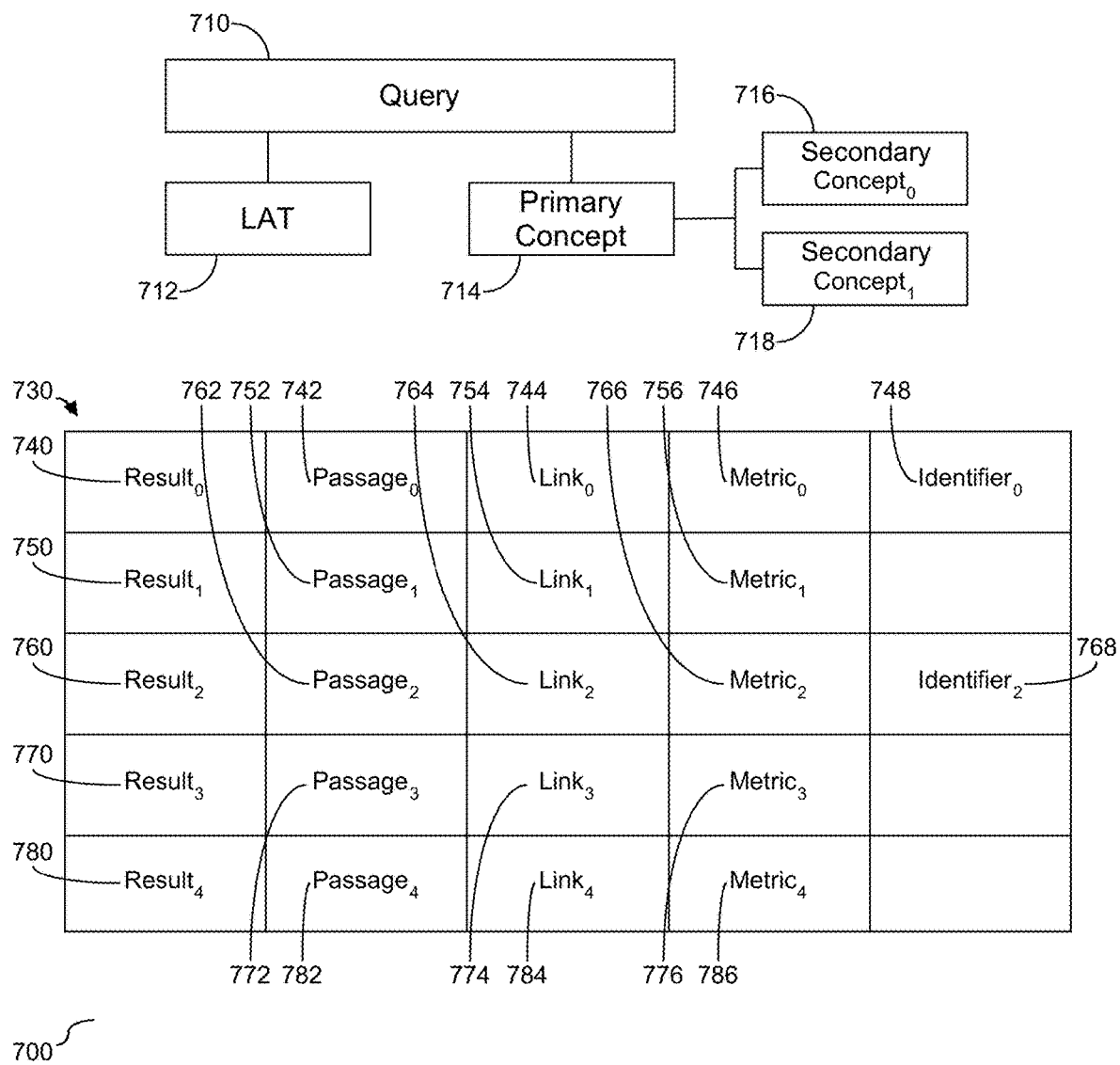
FIG. 7 depicts a block diagram illustrating a usecase example of the query submission and processing, as described in FIGS. 1-6.

Referring to FIG. 7, a block diagram (700) is provided to illustrate a usecase example of the query submission and processing, as described in FIGS. 1-6. As shown, a query (710) is received. The LAT (712) and a primary concept (714) present in the query (710) are identified. Two secondary concepts (716) and (718) are identified. Combinations of the LAT (712), primary concept (714), and the secondary concepts (716) and (718) are submitted to the corpus or library. The results from the query submission are shown at (730). In this example, there are five results, including $result_0$ (740), $result_1$ (750), $result_2$ (760), $result_3$ (770), and $result_4$ (780). $Result_0$ (740) is shown with a passage, $passage_0$ (742), a link, $link_0$ (744), an inter-cluster gain metric, $metric_0$ (746), and an expansion identifier, $identifier_0$ (748). $Result_1$ (750) is shown with $passage_1$ (752), $link_1$ (754), and $metric_1$ (756). There is only one document for $result_1$ (750), and as such, there is no expansion identifier provided. $Result_2$ (760) is shown with $passage_2$ (762), $link_2$ (764), $metric_2$ (766) and $identifier_2$ (768). $Result_3$ (770) is shown with $passage_3$ (772), $link_3$ (774), and $metric_3$ (776). There is only one document for $result_3$ (770), and as such, there is no expansion identifier provided. $Result_4$ (780) is shown with $passage_4$ (782), $link_4$ (784), and $metric_4$ (786). There is only one document for $result_4$ (780), and as such, there is no expansion identifier provided. The expansion identifier serves as a tool to show an expanded variety of query results, with selection of the identifier enabling presentation of additional query results related to the corresponding passage and link. Accordingly, each of the query results is provided with a representative passage, and link, and in select circumstances an expansion identifier.

Aspects of the query process shown in FIGS. 1-6, employ one or more functional tools, as shown and described in FIG. 1. Aspects of the functional tools (152)-(158) and their associated functionality may be embodied in a computer system/server in a single location, or in one embodiment, may be configured in a cloud based system sharing computing resources. With references to FIG. 8, a block diagram (800) is provided illustrating an example of a computer system/server (802), hereinafter referred to as a host (802) in communication with a cloud based support system, to implement the processes described above with respect to FIGS. 1-6. Host (802) is operational with numerous other general purpose or special purpose computing system environments or configurations. Examples of well-known computing systems, environments, and/or configurations that may be suitable for use with host (802) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (802) may be described in the general context of computer system-executable instructions, such as program modules, being executed by a computer system. Generally, program modules may include routines, programs, objects, components, logic, data structures, and so on that perform particular tasks or implement particular abstract data types. Host (802) may be practiced in distributed cloud computing environments where tasks are performed by remote processing devices that are linked through a communications network. In a distributed cloud computing environment, program modules may be located in both local and remote computer system storage media including memory storage devices.

Figure 8:
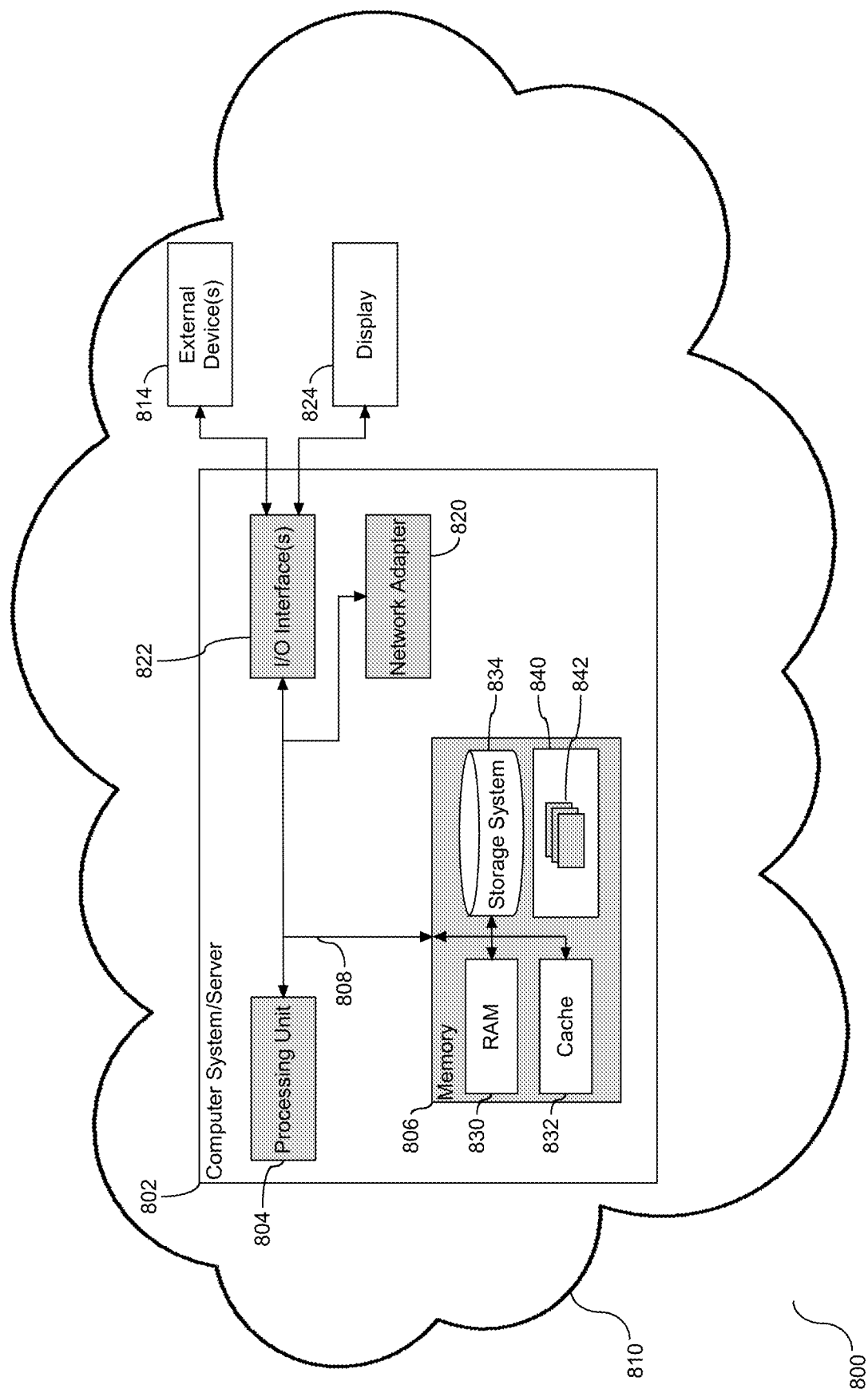
FIG. 8 depicts a block diagram illustrating an example of a computer system/server of a cloud based support system, to implement the system and processes described above with respect to FIGS. 1-7.

As shown in FIG. 8, host (802) is shown in the form of a general-purpose computing device. The components of host (802) may include, but are not limited to, one or more processors or processing units (804), e.g. hardware processors, a system memory (806), and a bus (808) that couples various system components including system memory (806) to processor (804). Bus (808) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (802) typically includes a variety of computer system readable media. Such media may be any available media that is accessible by host (802) and it includes both volatile and non-volatile media, removable and non-removable media.

Memory (806) can include computer system readable media in the form of volatile memory, such as random access memory (RAM) (830) and/or cache memory (832). By way of example only, storage system (834) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (808) by one or more data media interfaces.

Program/utility (840), having a set (at least one) of program modules (842), may be stored in memory (806) by way of example, and not limitation, as well as an operating system, one or more application programs, other program modules, and program data. Each of the operating systems, one or more application programs, other program modules, and program data or some combination thereof, may include an implementation of a networking environment. Program modules (842) generally carry out the functions and/or methodologies of embodiments to dynamically communication evaluation interrogatory identification and processing. For example, the set of program modules (842) may include the tools (152)-(158) as described in FIG. 1.

Host (802) may also communicate with one or more external devices (814), such as a keyboard, a pointing device, etc.; a display (824); one or more devices that enable a user to interact with host (802); and/or any devices (e.g., network card, modem, etc.) that enable host (802) to communicate with one or more other computing devices. Such communication can occur via Input/Output (I/O) interface(s) (822). Still yet, host (802) can communicate with one or more networks such as a local area network (LAN), a general wide area network (WAN), and/or a public network (e.g., the Internet) via network adapter (820). As depicted, network adapter (820) communicates with the other components of host (802) via bus (808). In one embodiment, a plurality of nodes of a distributed file system (not shown) is in communication with the host (802) via the I/O interface (822) or via the network adapter (820). It should be understood that although not shown, other hardware and/or software components could be used in conjunction with host (802). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (806), including RAM (830), cache (832), and storage system (834), such as a removable storage drive and a hard disk installed in a hard disk drive.

Computer programs (also called computer control logic) are stored in memory (806). Computer programs may also be received via a communication interface, such as network adapter (820). Such computer programs, when run, enable the computer system to perform the features of the present embodiments as discussed herein. In particular, the computer programs, when run, enable the processing unit (804) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (802) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
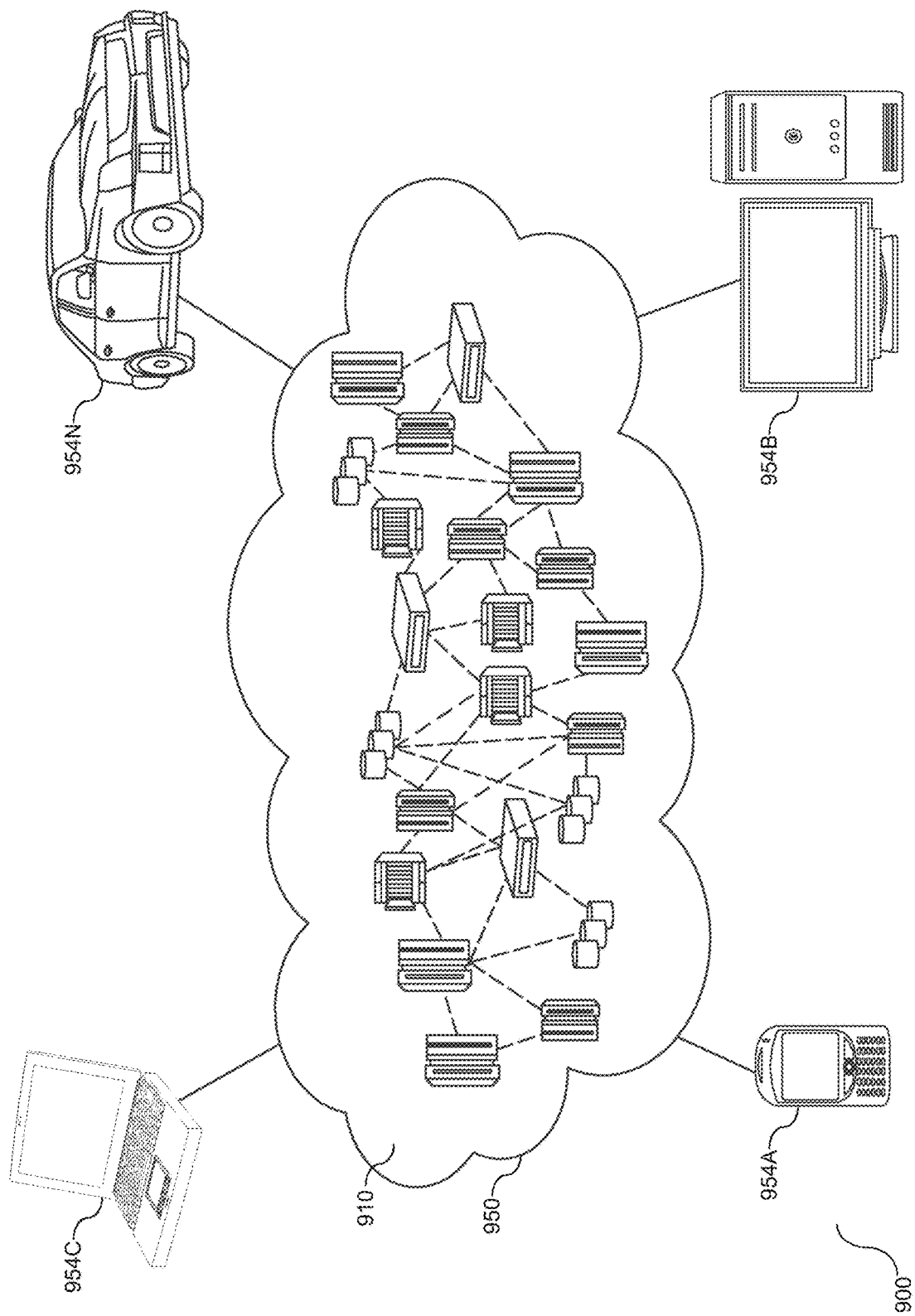
FIG. 9 depicts a block diagram illustrating a cloud computer environment.

Referring now to FIG. 9, an illustrative cloud computing network (900). As shown, cloud computing network (900) includes a cloud computing environment (950) having one or more cloud computing nodes (910) with which local computing devices used by cloud consumers may communicate. Examples of these local computing devices include, but are not limited to, personal digital assistant (PDA) or cellular telephone (954A), desktop computer (954B), laptop computer (954C), and/or automobile computer system (954N). Individual nodes within nodes (910) may further communicate with one another. They may be grouped (not shown) physically or virtually, in one or more networks, such as Private, Community, Public, or Hybrid clouds as described hereinabove, or a combination thereof. This allows cloud computing environment (900) to offer infrastructure, platforms and/or software as services for which a cloud consumer does not need to maintain resources on a local computing device. It is understood that the types of computing devices (954A-N) shown in FIG. 9 are intended to be illustrative only and that the cloud computing environment (950) can communicate with any type of computerized device over any type of network and/or network addressable connection (e.g., using a web browser).

Figure 10:
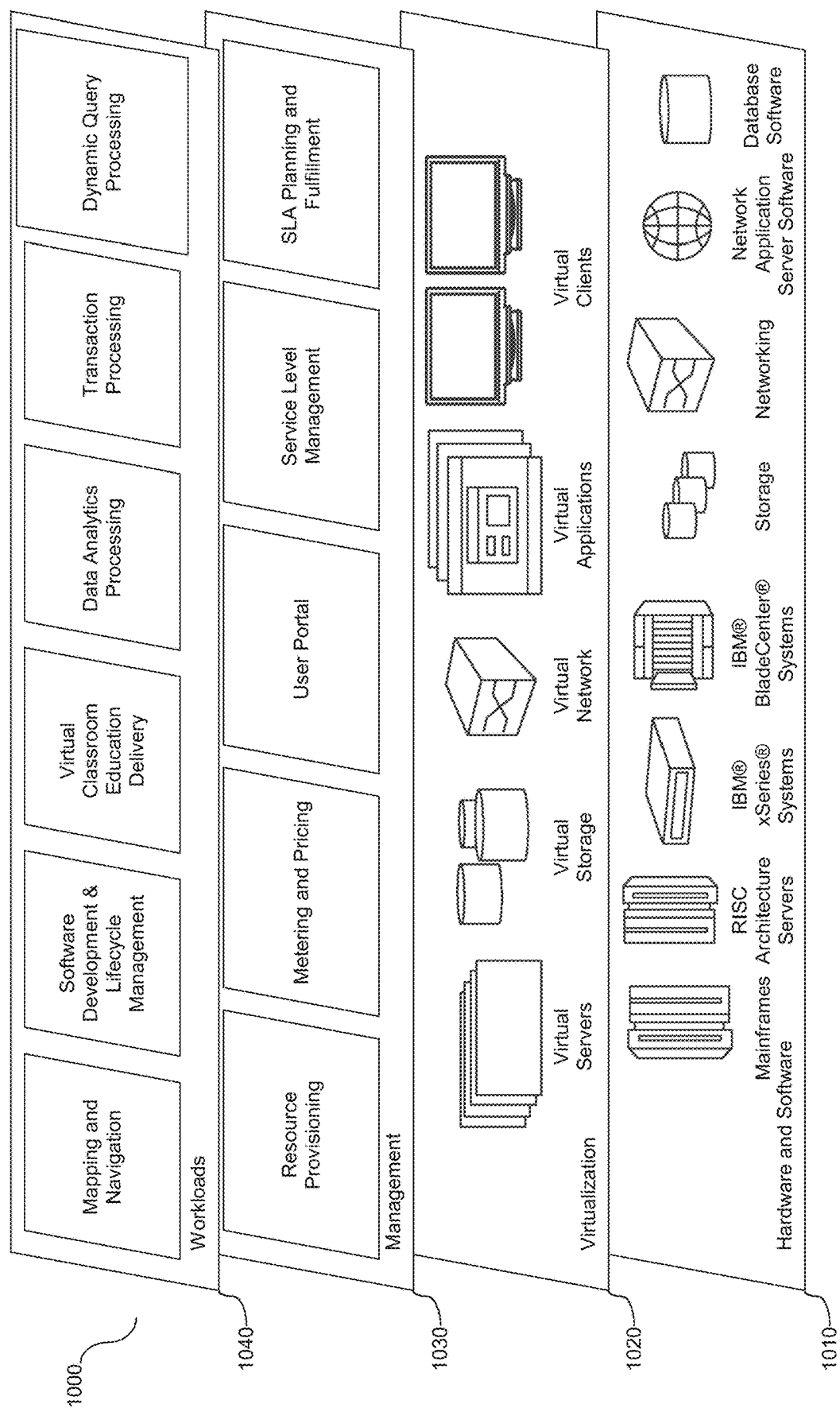
FIG. 10 depicts a block diagram illustrating a set of functional abstraction model layers provided by the cloud computing environment.

Referring now to FIG. 10, a set of functional abstraction layers (900) provided by the cloud computing network of FIG. 9 is shown. It should be understood in advance that the components, layers, and functions shown in FIG. 10 are intended to be illustrative only, and the embodiments are not limited thereto. As depicted, the following layers and corresponding functions are provided: hardware and software layer (1010), virtualization layer (1020), management layer (1030), and workload layer (1040).

The hardware and software layer (1010) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB® database software. (IBM, zSeries, pSeries, xSeries, BladeCenter, WebSphere, and DB2 are trademarks of International Business Machines Corporation registered in many jurisdictions worldwide).

Virtualization layer (1020) provides an abstraction layer from which the following examples of virtual entities may be provided: virtual servers; virtual storage; virtual networks, including virtual private networks; virtual applications and operating systems; and virtual clients.

In one example, management layer (1030) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1040) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and dynamic query processing.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to resolve interrogatories with intent identification and a corresponding response related to the identified intent.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, feedback may be provided on the quality of clustering and factored into the intra-cluster and inter-cluster metric assessments, which may dynamically modify the structure of the corresponding KG and MLM. Similarly, the natural language processing may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer system comprising:
    an artificial intelligence platform in communication with a processing unit, the platform to support document retrieval, including:
        a request manager configured to analyze a received request, including identify a lexical answer type (LAT) and a first concept relevant to the received request and a related second concept;
        a cluster manager, operatively coupled to the request manager, the cluster manager configured to utilize the LAT and the identified first and second concepts, and categorize entries in a corpus according to a clustering algorithm, including selectively form a first cluster with one or more documents having the LAT and the identified first concept and form a second cluster of one or more documents having a combination of the first and second sets of concepts; and
        the cluster manager configured to sort the first and second clusters according to relevancy to the received request; and
    a query result returned from the cluster manager, wherein the query result includes a first representative passage directed at the first cluster and a second representative passage directed at the second cluster.

2. The system of claim 1, wherein the LAT is a word in or a word inferred from the received request that indicates a type of answer to the received request independent of assigning semantics to the word.

3. The system of claim 1, further comprising the cluster manager configured to identify a representation document in one or more of the formed clusters.

4. The system of claim 1, further comprising the cluster manager configured to identify a first metric between the formed clusters and a second metric within at least one of the formed clusters, and further comprising the request manager configured to leverage the first metric and the second metric to identify one or more query results.

5. The system of claim 4, wherein the first and second metrics are a function of the received query.

6. The system of claim 1, wherein the second concept is associated with causing the first concept.

7. The system of claim 1, wherein at least one of the formed first and second clusters is a multiple document cluster, and further comprising the cluster manager configured to assign an expansion identifier to the multiple document cluster, wherein selection of the assigned expansion symbol returns one or more second representative documents and a second passage for each second representative document.

8. A computer program product to support document retrieval, the computer program product comprising a computer readable storage medium having program code embodied therewith, the program code executable by a processor to:
    analyze a received request, including identify a lexical answer type (LAT) and a first concept relevant to the received request and a related concept;
    utilize the LAT and the identified first and second concepts, and categorize entries in a corpus according to a clustering algorithm, including selectively form a first cluster with one or more documents having the LAT and the identified first concept and form a second cluster of one or more documents having a combination of the first and second sets of concepts; and
    sort the first and second clusters according to relevancy to the received request; and
    a query result returned from the cluster sort, wherein the query result includes a first representative passage directed at the first cluster and a second representative passage directed at the second cluster.

9. The computer program product of claim 8, wherein the LAT is a word in or a word inferred from the received request that indicates a type of answer to the received request independent of assigning semantics to the word.

10. The computer program product of claim 8, further comprising program code to identify a representation document in one or more of the formed clusters.

11. The computer program product of claim 8, further comprising program code to identify a first metric between the formed clusters and a second metric within at least one of the formed clusters, and program code to leverage the first metric and the second metric to identify one or more query results.

12. The computer program product of claim 8, wherein the second concept is associated with causing the first concept.

13. The computer program product of claim 8, wherein at least one of the formed first and second clusters is a multiple document cluster, and further comprising program code to assign an expansion identifier to the multiple document cluster, wherein selection of the assigned expansion identifier returns one or more second representative documents and a second passage for each second representative document.

14. A method comprising:
- analyzing a received request, including identifying a lexical answer type (LAT) and a first concept relevant to the received request and a related second concept;
- utilizing the LAT and the identified first and second concepts, categorizing entries in a corpus according to a clustering algorithm, including selectively forming a first cluster with one or more documents having the LAT and the identified first concept and forming a second cluster of one or more document having a combination of the first and second sets of concepts;
- sorting the first and second clusters according to relevancy to the received request;
- a query result returned from the sorting, wherein the query result includes a first representative passage directed at the first cluster and a second representative passage directed at the second cluster.

15. The method of claim 14, wherein the LAT is a word in or a word inferred from the received request that indicates a type of answer to the received request independent of assigning semantics to the word.

16. The method of claim 14, further comprising identifying a representation document in one or more of the formed clusters.

17. The method of claim 14, further comprising identifying a first metric between the formed clusters and a second metric within at least one of the formed clusters, and leveraging the first metric and the second metric to identify one or more query results.

18. The method of claim 17, wherein the first and second metrics are a function of the received query.

19. The method of claim 14, wherein the second concept is associated with causing the first concept.

20. The method of claim 14, wherein at least one of the formed first and second clusters is a multiple document cluster, and further comprising assigning an expansion identifier to the multiple document cluster, wherein selection of the assigned expansion identifier returns one or more second representative documents and a second passage for each second representative document.

* * * * *